United States Patent [19]

Katayama et al.

[11] 4,237,745
[45] Dec. 9, 1980

[54] REVERSE SHIFT MECHANISM FOR POWER TRANSMISSION UNIT

[75] Inventors: Nobuaki Katayama; Hideaki Koga, both of Toyota, Japan

[73] Assignee: Toyota Jidosha Kogyo Kabushiki Kaisha, Aichi, Japan

[21] Appl. No.: 31,397

[22] Filed: Apr. 19, 1979

[30] Foreign Application Priority Data

Aug. 2, 1978 [JP] Japan .................................. 53/94410

[51] Int. Cl.³ ............................................ F16H 3/38
[52] U.S. Cl. ......................................... 74/339; 74/477
[58] Field of Search ................. 74/339, 342, 343, 344, 74/473 R, 477, 347; 192/99 S, 82 R

[56] References Cited

U.S. PATENT DOCUMENTS 1,471,730  10/1923  Haskin .................................... 74/347
2,911,856  11/1959  Simpson et al. .................... 74/477 X

FOREIGN PATENT DOCUMENTS 1188598  4/1970  United Kingdom ..................... 74/339
1195938  6/1970  United Kingdom ..................... 74/339

Primary Examiner—C. J. Husar
Assistant Examiner—Frank McKenzie
Attorney, Agent, or Firm—Oblon, Fisher, Spivak, McClelland & Maier

[57] ABSTRACT

A reverse shift mechanism for a power transmission unit comprises a plurality of fork shafts slidably supported from a transmission casing in parallel with each other to be shifted by an operator's shift lever, a shift head fixed to one of the fork shafts, a shift arm rotatably supported by the shift head at its intermediate portion and being pivoted at its lower end on a portion of the transmission casing, and a shift fork slidably mounted on another one of the fork shafts and being rotatably supported by the upper end of the shift arm, the shift fork receiving thereon a reverse idler gear to shift it toward and away from a reverse drive gear and a reverse output gear.

4 Claims, 7 Drawing Figures

REVERSE SHIFT MECHANISM FOR POWER TRANSMISSION UNIT

BACKGROUND OF THE INVENTION

The present invention relates to a reverse shift mechanism for power transmission units, and more particularly to a reverse shift mechanism for a power transmission unit of the type in which a reverse idler gear is arranged to be brought into engagement with a reverse drive gear and a reverse output gear thereby to provide a reverse drive power path.

In such conventional power transmission units, the reverse output gear is arranged on an output mainshaft to be positioned in a common vertical plane with the drive gear under neutral condition of the transmission unit, and the reverse idler gear is slidably mounted on a reverse idler shaft to be brought into engagement with the drive and output gears. For selectively completing the reverse drive power path, the reverse shift mechanism acts to axially shift the idler gear toward and away from the drive and output gears. In use of the reverse shift mechanism, the operational feeling is greatly influenced by axial movements of the idler gear along the reverse idler shaft.

SUMMARY OF THE INVENTION

It is, therefore, a primary object of the present invention to provide a reverse shift mechanism in which a reverse shift fork member is arranged to smoothly shift the idler gear toward and away from the drive and output gears so as to obtain good operational feeling in shifting operation.

According to the present invention there is provided a reverse shift mechanism for a power transmission unit having a reverse drive gear train assembled within a transmission casing, the reverse drive gear train including a reverse drive gear drivingly connected to an output shaft of a vehicle engine, a reverse output gear arranged on an output mainshaft to be positioned in a common vertical plane with the drive gear and a reverse idler gear slidably mounted on a reverse idler shaft to be brought into engagement with the drive gear and the output gear, the output mainshaft and the idler shaft being supported from the transmission casing in parallel with each other, the reverse shift mechanism comprising:

a plurality of fork shafts slidably supported from the transmission casing in parallel with the idler shaft and being located adjacent to the reverse idler gear to be shifted by an operator's shift lever in an axial direction;

a shift head member fixed to one of the fork shafts;

a shift arm member rotatably supported by the shift head at its intermediate portion and being pivoted at its one end on a portion of the transmission casing to be swung by axial movement of the shift head member; and a shift fork member slidably mounted on another one of the fork shafts and being rotatably supported by the other end of the shift arm member, the shift fork member receiving thereon the reverse idler gear to shift the idler gear toward and away from the drive gear and the output gear.

BRIEF DESCRIPTION OF THE DRAWINGS

Other objects and advantages of the present invention will become more apparent from the description made hereinbelow with respect to a preferred embodiment thereof in conjunction with the accompanying drawings, in which.

DESCRIPTION OF THE PREFERRED EMBODIMENT

Figure 1:
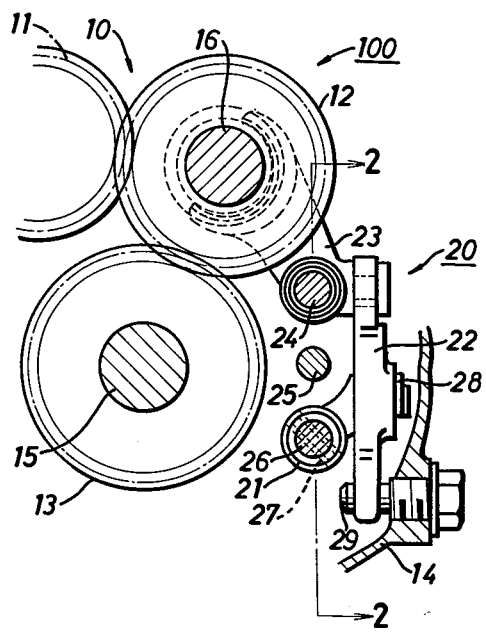
FIG. 1 is a front view of a reverse drive gear train assembled within a power transmission unit, showing respective gears of the gear train in relation to a reverse shift mechanism of the present invention.

Referring now to the drawings, particularly in FIG. 1, a power transmission unit 100 for an automotive vehicle is provided with a reverse drive gear train 10 which includes a reverse drive gear 11, a reverse idler gear 12 and a reverse output gear 13. The reverse idler gear 12 is axially slidable to be brought into engagement with the gears 11 and 13. The transmission unit 100 is further provided with a reverse shift mechanism 20 which is arranged to conduct the sliding engagement of the reverse idler gear 12 against the gears 11 and 13.

The reverse drive gear 11 is rotatably supported from a transmission casing 14 and is drivingly connected to an output shaft of a vehicle engine by way of a frictional engagement mechanism (not shown) of the transmission unit 100. The reverse output gear 13 is integrally formed with a synchronizer on an output mainshaft 15 of the transmission unit 100 and is arranged to be positioned in a common vertical plane with the reverse drive gear 11 when the synchronizer is in its neutral position. The mainshaft 15 is rotatably supported from the transmission casing 14 and is drivingly connected to drive wheel axles by way of a final drive gearing (not shown). The reverse idler gear 12 is slidably mounted on a reverse idler shaft 16 which is fixedly supported from the transmission casing 14 in parallel with the mainshaft 15.

Figure 5:
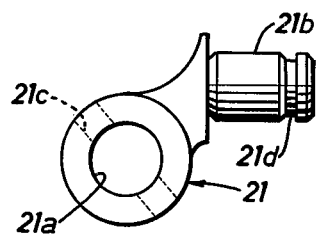
FIG. 5 is an enlarged front view of a shift head of the reverse shift mechanism.

The reverse shift mechanism 20 comprises a reverse shift fork 23 to move the reverse idler gear 12 toward and away from the gears 11 and 13. The reverse shift mechanism 20 is provided with a shift head 21 which includes a bearing bore 21a, a support leg 21b and a radial through hole 21c, as shown in FIG. 5. The shift head 21 is mounted on a lowermost fork shaft 26 and is fixed in place by a spring pin 27 pressedly inserted into the shaft 26 through the radial hole 21c, as shown in FIG. 1. The fork shaft 26 is arranged in parallel with another two fork shafts 24 and 25 and also in parallel with the mainshaft 15 and the reverse idler shaft 16. These fork shafts 24, 25 and 26 are supported from the transmission casing 14 to be slidable in an axial direction. In the shaft arrangement, a shift restriction mechanism 30 is provided to permit axial movements of one of the fork shafts and simultaneously to restrict axial movements of the remaining fork shafts. Bridged between the fork shafts 24 and 25 is a 1-2 shift fork 31 which is fixed to the fork shaft 24 to conduct 1-2 shift operation of the transmission unit 100, and a 3-4 shift fork 32 is fixed to the fork shaft 25 to conduct 3-4 shift operation of the transmission unit 100.

Figure 3:
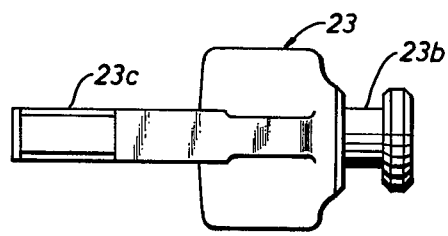
FIG. 3 is an enlarged plan view of a reverse shift fork of the reverse shift mechanism.
Figure 4:
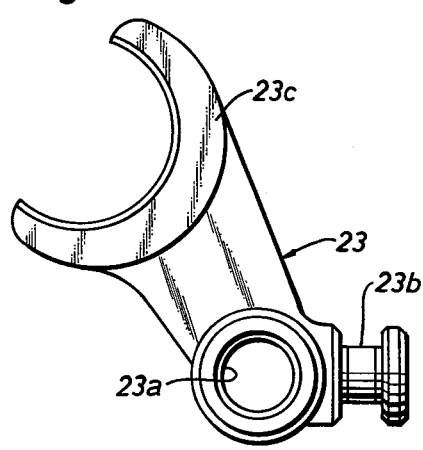
FIG. 4 is an enlarged front view of the reverse shift fork.
Figure 6:
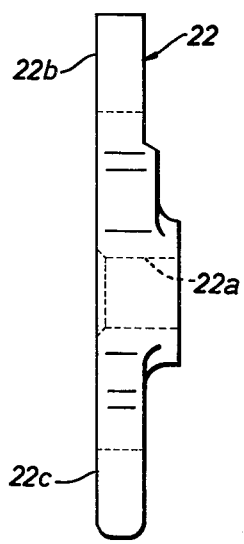
FIG. 6 is an enlarged front view of a shift arm of the reverse shift mechanism.
Figure 7:
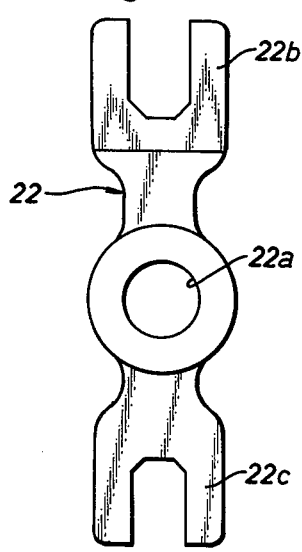
FIG. 7 is an enlarged side view of the shift arm.

As shown in FIGS. 6 and 7, a reverse shift arm 22 is provided with a bearing bore 22a and a pair of U-shaped arms 22b and 22c. The shift arm 22 is rotatably mounted at its bearing bore 22a on the support leg 21d of shift head 21 and is positioned in place by means of a clip fastener 28 clamped within an annular groove 21d of the support leg 21b. Thus, the reverse shift arm 22 is pivoted at its lower arm 22c on a lateral pin 29 fixed to the transmission casing 14 in such a manner that the lateral pin 29 acts as a fulcrum to swing the shift arm 22 by axial movement of the shift head 21. As shown in FIGS. 3 and 4, the reverse shift fork 23 is provided with a bearing bore 23a, a shank portion 23b and a claw portion 23c. The shift fork 23 is slidably mounted on the uppermost fork shaft 24 and is rotatably supported at its shank portion 23b by the upper arm 22b of shift arm 22. The claw portion 23c of shift fork 23 receives thereon the reverse idler gear 12, and it is axially shifted along the fork shaft 24 by swing movement of the reverse shift arm 22 to move the idler gear 12 toward and away from the reverse drive gear 11 and the reverse output gear 13.

Figure 2:
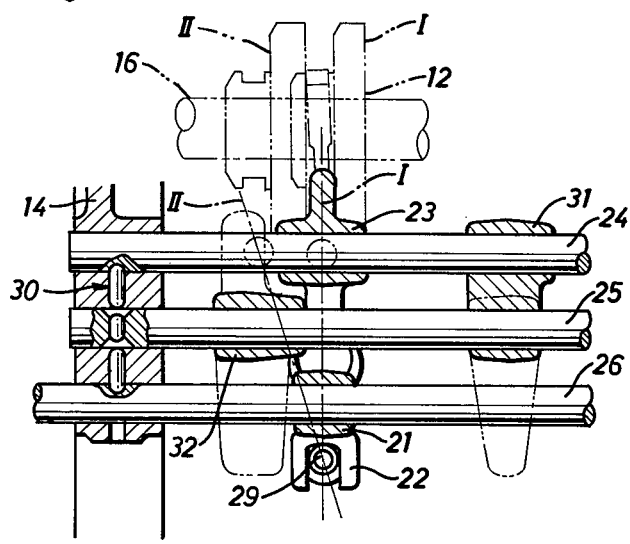
FIG. 2 is a side view of the reverse shift mechanism taken along the plane of line 2—2 in FIG. 1.

With the embodiment having the above-mentioned construction, when the fork shaft 26 is moved by an operator's shift lever (not shown) in a leftward direction, the shift head 21 moves to swing the reverse shift arm 22 in a counter-clockwise direction. Then, the reverse shift fork 23 is shifted along the fork shaft 24 to move the reverse idler gear 12 from a first position I to a second position II, as shown by an imaginary line in FIG. 2. The moving stroke of shift fork 23 is approximately twice as long as the leftward movement of the shift head 21. Thus, the reverse idler gear 12 is brought into engagement with the gears 11 and 13 to complete the reverse drive power path.

During the above-mentioned shift operation, it will be noted that the reverse shift fork 23 is linearly slided along the fork shaft 24 to shift the reverse idler gear 12 without undesirable inclination. This serves to ensure smooth sliding movement of the reverse idler gear 12 thereby to obtain good operational feeling in shifting operation. In addition, it will be also noted that the functional feature is obtainable in shifting operation of the shift fork 23 for disengagement of the reverse idler gear 12 from the gears 11 and 13. Thus, the rotational torque transmission from the drive gear 11 to the output gear 13 is smoothly disconnected upon shifting operation of the operator's shift lever.

Having thus described the preferred embodiment of the invention it should be understood that numerous structural modifications and adaptations may be resorted to without departing from the spirit of the invention.

What is claimed is:

1. A reverse shift mechanism for a power transmission unit having a reverse drive gear train assembled within a transmission casing, said reverse drive gear train including a reverse drive gear drivingly connected to an output shaft of a vehicle engine, a reverse output gear arranged on an output mainshaft to be positioned in a common vertical plane with said drive gear and a reverse idler gear arranged on a reverse idler shaft to be brought into engagement with said drive gear and said output gear, said output mainshaft and said idler shaft being supported from said transmission casing in parallel with each other, said reverse shift mechanism comprising:

a plurality of fork shafts slidably supported from said transmission casing in parallel with said idler shaft to be shifted by an operator's shift lever in an axial direcion;

a shift arm member rotatably mounted on a first shaft selected from said fork shafts and being pivoted on a portion of said transmission casing to be swung in response to axial movement of said first shaft; and a shift fork member slidably mounted on a second shaft selected from said fork shafts and spaced from said first shaft and being supported by a swingable portion of said shift arm member to be moved along said second shaft, said shift fork member receiving thereon said reverse idler gear to shift it toward and away from said drive and output gears.

2. A reverse shift mechanism for a power transmission unit as claimed in claim 1, further comprising a shift head member fixed to said first shaft, said shift arm member being rotatably supported by said shift head member at its intermediate portion and pivoted at its one end on a portion of said transmission casing, and said shift fork member being supported by the other end of said shift arm member.

3. A reverse shift mechanism for a power transmission unit as claimed in claim 2, wherein said shift head member includes a support leg for rotatably supporting thereon said shift arm member, and said shift fork member includes a shank portion received by said shift arm member and a claw portion coupled with said reverse idler gear.

4. A reverse shift mechanism for a power transmission unit as claimed in claim 3, wherein said shift arm member is provided at its opposite ends with a pair of U-shaped arms respectively pivoted on a lateral pin fixed to said transmission casing and supporting thereon the shank portion of said shift fork member.

* * * * *